United States Patent [19]

Garrett

[11] Patent Number: 4,987,680
[45] Date of Patent: Jan. 29, 1991

[54] HYDRAULIC LOPPING SHEAR/POLE PRUNER

[76] Inventor: Gordon W. Garrett, 1540 Hoffman Ave., Monterey, Calif. 93940

[21] Appl. No.: 339,260

[22] Filed: Apr. 17, 1989

[51] Int. Cl.⁵ .............................................. B23P 19/04
[52] U.S. Cl. ........................................ 30/228; 30/180
[58] Field of Search .................. 30/180, 228, 241, 182

[56] References Cited

U.S. PATENT DOCUMENTS

| | | | |
|---|---|---|---|
| 2,714,250 | 8/1955 | Twedt | 30/180 |
| 2,932,892 | 6/1960 | Offner | 30/249 |
| 3,041,725 | 7/1962 | Harries | 30/228 X |
| 3,922,782 | 12/1975 | Lind | 30/228 |
| 4,198,748 | 4/1980 | Lewis | 30/180 |

Primary Examiner—Douglas D. Watts

[57] ABSTRACT

A versatile tool for cutting woody vegetation or other materials which can be adapted for use as either: a hand held, hydraulically actuated lopping shear for use within the operator's normal reach; or, a powerful pole pruner for cutting at a distance when the shear is attached to an extension mechanism. The lopping shear has a basically tubular body which is gripped with one hand while cutting force is applied to an axial piston by the other. The operator's effort is multiplied by hydraulic fluid acting between a smaller piston driven directly by the operator and a larger piston attached to a sliding blade working in opposition to a hook structure fixed to the shear body. Work located beyond easy reach can be cut by attaching the lopping shear to the extension mechanism. This mechanism has a quick action coupling to lock the shear to one end of a tube containing another concentric, sliding tube which transmits to the shear, cutting force applied by the operator to a handle at its opposite end.

8 Claims, 4 Drawing Sheets

HYDRAULIC LOPPING SHEAR/POLE PRUNER

BACKGROUND

This invention relates to cutting tools, specifically to lopping shears and pole pruners, being a tool adaptable for use in either capacity.

Large numbers of hand pruners, lopping shears, pole pruners and other cutting tools are used to aid in the control of vegetation. This is a versatile tool that can be used in either of two configurations: as a compact, hand held hydraulic lopping shear for cutting within the operator's normal reach; or, as a pole pruner when the lopping shear is mounted on an extension mechanism for work located at some distance or height from the operator.

One prior patent describes a small, commonly available scissors pruner detachably mounted to the end of a pole fitted on the outside with a system of ropes and pulleys whereby the pruner can be operated at a distance. My invention provides a hydraulically actuated pruner that is more powerful and can be used for heavier work than is feasible using this device. In addition, the present invention utilizes a concentric tube to transmit cutting force from the operator to the pruner. This mechanism is both easier to use and less cumbersome than ropes and pulleys.

Another patent, for a "Hydraulic Pruning and Cutting Tool", covers a hand held, hydraulic pruner with fundamental differences from my invention which has eliminated the separate pumps, valves or fluid reservoirs previously required. A complete cut can be made with the present invention using only one motion of the operator's arm, and the blade can be retracted and made ready for another cut without opening or closing any valves. The cutting blade of the invention is removable for replacement or sharpening and operates within view rather than being hidden behind the material being cut. Furthermore, the prior tool could not practically be pole mounted due to the arrangement of its pump handle and the weight inherent in its construction.

OBJECTS AND ADVANTAGES

Amateur and professional horticulturists typically own both a lopping shear for pruning woody growth near ground level and a pole pruner for conveniently cutting limbs and branches out of normal reach. Since the combined cost of quality specimens of these two tools is high, it is desirable to have a single cutting device which can easily be adapted for use in either situation.

The lopping shear of the invention is shorter than a scissors shear of equal mechanical advantage and, because its handles do not have to be spread laterally for work to be inserted in the cutting jaws, it is more easily used in confined spaces such as between tree branches. This tool, when constructed using modern materials, is lighter than the scissors type which employ heavy forgings to contain the stresses concentrated at their fulcrum. Its balanced, inherently compact form, make this cutter less tiring to use and easy to carry.

Part of the weight of scissors pruners is a thickened blade required to carry moments generated by the lever action of the handles. Since the blade of my invention is not part of a lever, these moments are absent on the blade allowing it to be thinner and therefore more easily forced through the material being cut. The blades are simple, inexpensive rectangles which can be quickly removed for sharpening or replacement. Scissors pruners can only be sharpened with difficulty and are destroyed if their blades are bent or broken.

Its tapered handle affords the operator a secure grip and allows the pruner to be quickly and securely attached to an extension mechanism containing an internal tube which transmits cutting force from the operator to the pruner. No clumsy and easily entangled external ropes, pulleys or levers are used. Existing pole pruners require the operator to support the pole with one hand while pulling with the other hand on a rope which activates the cutting head. My invention enables the operator to control the pole with both hands; and, since cutting force is applied in a direction away from the operator, it assists in supporting the tool when doing overhead work.

As shown by the preceding discussion, the present invention meets the primary objective of dual function while providing other significant improvements over the prior art. Additional advantages will become apparent from a consideration of the accompanying drawings and description.

DESCRIPTION OF DRAWINGS

FIG. 3 is a cross section of the lopping shear's hook structure.

FIG. 4 is a cross section of the extension mechanism's mounting hardware.

DESCRIPTION

Lopping Shear

Figure 1A:
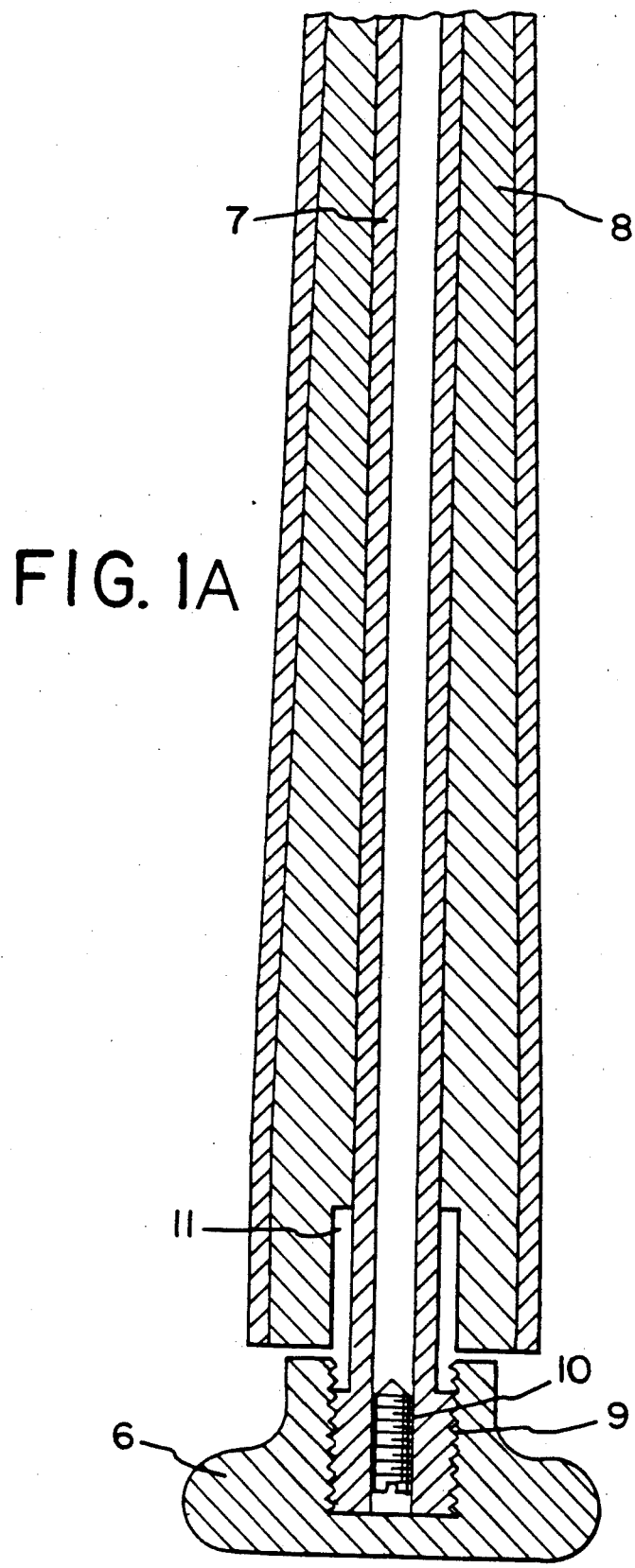
FIG. 1 is a longitudinal section of the lopping shear.
Figure 1B:
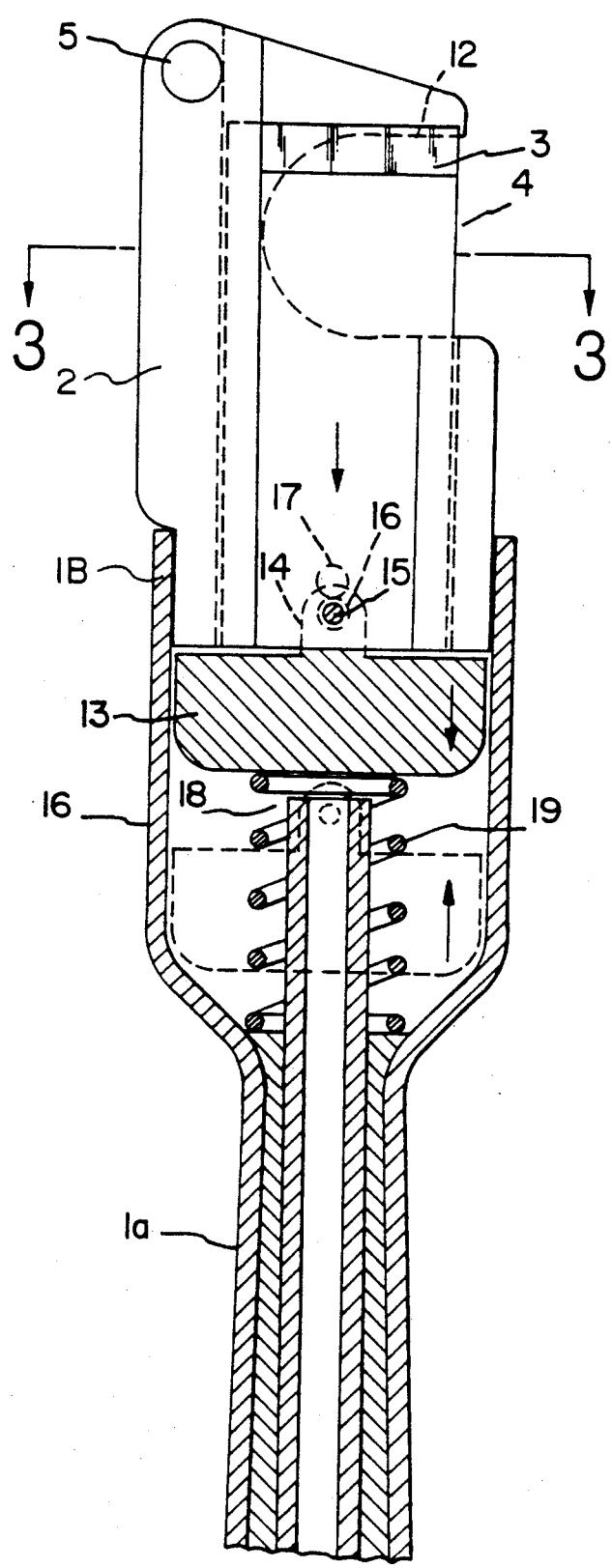

FIG. 1 is a longitudinal section of the lopping shear showing solid line piston 13 and blade 3 extended as at the completion of a cut. Its tubular steel body has tapered handle portion 1A and cylinder portion 1B with steel hook structure 2 welded to its open end.

Hook structure 2 has a complex shape as shown by FIG. 1 and cross section FIG. 3. It is pierced by hole 5 by which the tool can be hung up. When the blade is retracted, hook opening 4 can receive the work to be cut; distal shearing edge 12, being stationary, holds the work against the action of blade 3. The hook structure contains channel 25 down its length in which the blade reciprocates. Parallel overhangs 26 on either edge of the channel retain blade 3 against torsional forces insuring it will slide closely over edge 12.

Plastic knob 6 is threadedly attached to one end of elongated piston 7 by means of threaded metallic insert 9. Elongated piston 7 is a tube closed at the knob end by screw 10 which can be removed to bleed air from cylinder cavity 18 or to allow removal of piston 7 from the bore in which it slides. This bore is molded into plastic or metallic insert 8 which is glued or crimped into handle 1A. The bore through insert 8 opens at one end into cylinder cavity 18 in which piston 13 reciprocates. This cavity contains compression spring 19 operatively interposed between power piston 13 and the bottom of cylinder 1B. In the absence of any operational force, this spring keeps piston 13 with attached blade 3 extended and draws elongated piston 7 through handle 1A and into cylinder 18.

Metal blade 3 rests on top of plastic or metal power piston 13. This rectangular blade has one of its short edges sharpened and is pierced by hole 16 on its longitudinal center line near the unsharpened edge. Two lobes 14 project from the top of piston 13 forming a clevis which receives blade 3. Metal pin 15 passes longitudinally through lobes 14 and hole 16 thereby securing the blade to the piston.

Extension Mechanism

Figure 2A:
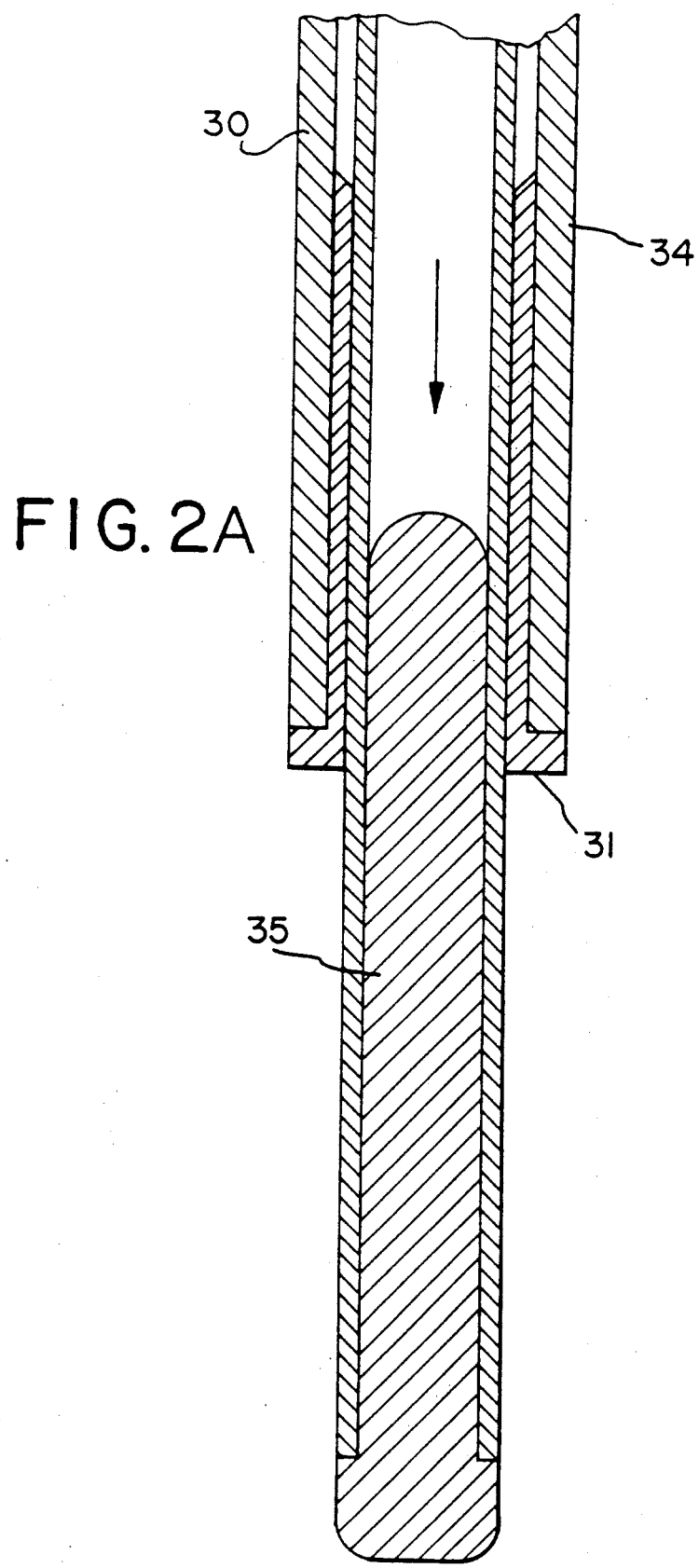
FIG. 2 is a longitudinal section of the extension mechanism and mounting hardware.
Figure 2B:
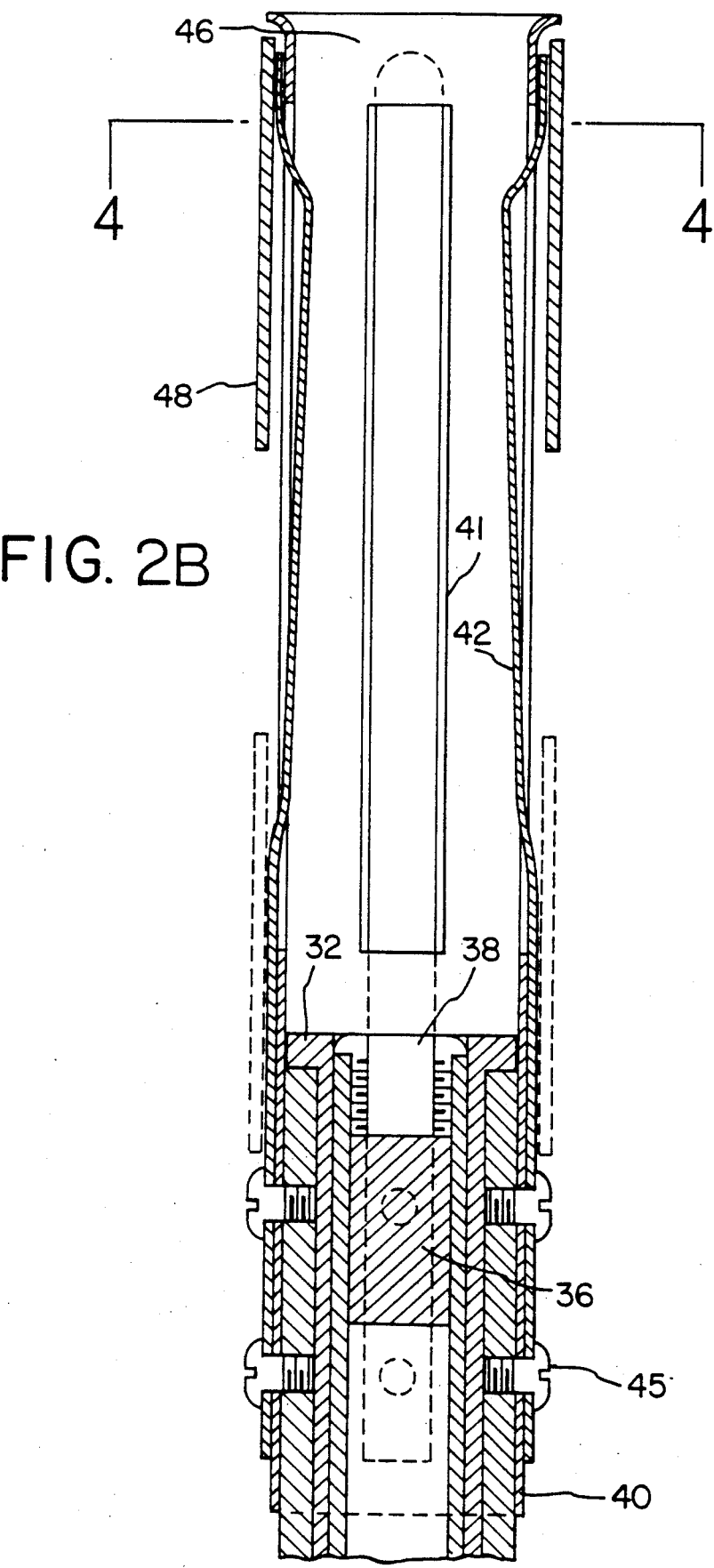

The extension mechanism has two concentric fiberglass, plastic or metal tubes of any obtainable desired length and diameter as shown in FIG. 2. Proximal plastic bushing 31 and distal bushing 32, glued into the ends of outer tube 30, allow internal tube 34 to slide freely within outer tube 30.

Plastic handle 35 is glued to the proximal end of tube 34. This handle has a diameter equal to tube 34 and can pass through bushing 31. The distal end of tube 34 has metal fitting 36 glued into it. This fitting contains concentric threaded bore 38 into which end 9 of piston 7 can be threaded. Fitting 36 has a maximum diameter equal to that of tube 34 and can pass through bushing 32.

The distal end of tube 30 has tubular steel sleeve 40 fitted over it. This sleeve projects past the end of tube 30 where it is pierced by rectangular slots 41. Elongated spring steel strips 42 and steel sleeve 40 are attached to tube 30 by screws 45. The strips 42 are slightly narrower than slots 41 and are formed so that, when depressed (solid line position in FIG. 4), a portion of their length can pass through the slots and lie parallel to, and in contact with, handle 1A of the lopping shear after it is inserted into the open end of sleeve 40.

Tubular metal slide 48 encircles spring steel strips 42 and sleeve 40 and serves to bend the strips into contact with handle 1A and lock them in that position.

OPERATION

Lopping Shear

CUTTING: The shear is gripped in one hand by handle portion 1A of the body while the other hand grasps knob 6. When the knob is pulled away from the body of the shear, a portion of attached piston 7 slides out of the handle. This piston acts hydraulically on piston 13 displacing it to the dashed line position of FIG. 1 and drawing attached blade 3 back toward the tool body clearing hook opening 4. Once cleared, the material to be cut can be inserted into the hook opening.

Cutting is accomplished by pushing the knob and piston toward the tool body. Since piston 13 has a greater area than piston 7, the blade is forced through material held in the hook opening and past shearing edge 12 by a force many times greater than the force exerted by the operator.

BLADE REMOVAL: Blade 3 is removed by unscrewing knob 6 from piston 7 and pushing it into recess 11 in the handle. This causes piston 13 to advance sufficiently for pin 15 to line up with two holes 17 in the wall of cylinder 1B. In this position, a rod can be inserted through one of these holes and pin 15 pushed through hole 16 in blade 3. Once freed from the piston, the blade can be slid out of the clevis 14, down the hook channel 25 and removed.

Extension Mechanism

The lopping shear is prepared for attachment to the extension mechanism by pulling knob 6 away from the shear body to its maximum extent. The knob is then unscrewed from the piston 7 and its threaded end 9 inserted into sleeve 40 and screwed into the threaded recess 38 provided in fitting 36.

With locking slide 48 disengaged (moved away from the end of sleeve 40 to the dashed line position of FIG. 2), lopping shear handle 1A is inserted into the opening of sleeve 40 until it rests on bushing 32. The locking slide is then pushed toward the shear. As the slide passes over the sloping distal portions of the four spring steel strips 42, they are depressed radially through the slots in sleeve 40 and into contact with the tapered handle 1A of the lopping shear. The lopping shear is disengaged from the extension mechanism by reversing the above procedure.

Once secured to the extension mechanism, the lopping shear is operated by pulling and pushing on handle 35 just as the unextended lopping shear is operated by means of knob 6.

Having fully described one embodiment of my invention, I do not wish to be limited in my patent to these specific details. Rather, I request that the scope of my invention be determined by the following claims and their legal equivalents.

I claim:

1. A hydraulic lopping shear/pole pruner for use either within the operator's normal reach or at a distance, comprising:

(a) a lopping shear comprising:
   a hook structure having a fixed shearing edge cooperating with a blade slidably mounted in said hook structure, a hydraulic cylinder fixed to said hook structure, a reciprocating power piston within said cylinder detachably connected to said blade, a coaxial handle coextensive with said cylinder, a bore through the longitudinal axis of said handle opening at one end into said cylinder, an elongated piston of lesser diameter than said power piston sliding in said bore and said cylinder, fluid means within said cylinder and said bore by which operational force applied to said elongated piston is multiplied and used to produce force and motion in said power piston and said attached blade, said elongated piston and said handle being only long enough to produce the desired amount of travel and force in said power piston and said blade, a knob detachably mounted at one end of said elongated piston by which said elongated piston can be grasped and moved within said bore, bias means within said cylinder to extend said power piston until said attached blade slides over said shearing edge while retracting and retaining said elongated piston into said handle to its maximum extent;

(b) elongated extension means to which said lopping shear can be attached and operated at some distance or height from the operator, comprising:
   two tubes of any desired length wherein one tube fits within the end of the other, annular bushings fitted at each end of the outer tube whereby the inner tube is supported concentrically and slidably within said outer tube, a handle coextensive with one end of said inner tube, attachment means at the other end of said inner tube whereby said elongated piston of said lopping shear can be detachably connected, a sleeve fitted concentrically over the end of said outer tube and extending beyond the end of said outer tube into which the handle of said lopping shear can be inserted, a plurality of slots through the wall of said sleeve, formed steel strips attached to the outside of said sleeve which, when deflected radially inward, can pass through said slots and into contact with said handle of said lopping shear, a tubular slide encircling said strips and sleeve by means of which said strips can be radially depressed and held in contact with said handle.

2. A lopping shear according to claim 1 in which said blade slides in two parallel channels which enclose both longitudinal margins of said blade.

3. A lopping shear according to claim 1 in which said handle is tapered.

4. A lopping shear according to claim 1 in which said blade is detachably connected to said power piston by means of a pin passing through two piston lobes and a hole in said blade.

5. A lopping shear according to claim 1 in which said bias means is a steel spring.

6. A lopping shear according to claim 1 in which said elongated piston is a tube closed at the knob end by a removable screw.

7. Annular bushings according to claim 1 in which the inner circumference is beveled and cooperates with the rounded circumference of said attachment means to insure that said inner tube can slide through said outer tube without interference from said annular bushing.

8. An extension means according to claim 1 in which said inner tube handle can pass through said annular bushings.

* * * * *